United States Patent
Grasso et al.

(10) Patent No.: US 8,631,537 B2
(45) Date of Patent: Jan. 21, 2014

(54) METHOD FOR MANUFACTURING A WINDSHIELD WIPER BLADE

(75) Inventors: Guiseppe Grasso, Le Breuil sur Couze (FR); Nicolas Ollier, Arsac en Velay (FR)

(73) Assignee: Valea Systemes d'Essuyage, La Verriere (FR)

( * ) Notice: Subject to any disclaimer, the term of this patent is extended or adjusted under 35 U.S.C. 154(b) by 1056 days.

(21) Appl. No.: 12/303,180

(22) PCT Filed: Jun. 11, 2007

(86) PCT No.: PCT/EP2007/055693
§ 371 (c)(1),
(2), (4) Date: Dec. 2, 2008

(87) PCT Pub. No.: WO2007/144319
PCT Pub. Date: Dec. 21, 2007

(65) Prior Publication Data
US 2009/0158545 A1    Jun. 25, 2009

(30) Foreign Application Priority Data

Jun. 14, 2006 (FR) ...................................... 06 05272

(51) Int. Cl.
*B60S 1/32*  (2006.01)
*B60S 1/38*  (2006.01)

(52) U.S. Cl.
USPC .............. 15/250.43; 15/250.201; 15/250.451; 15/250.44

(58) Field of Classification Search
USPC ........... 15/250.43, 250.44, 250.361, 250.201, 15/250.451, 250.452, 250.453, 250.454, 15/250.32
See application file for complete search history.

(56) References Cited

U.S. PATENT DOCUMENTS

| | | | |
|---|---|---|---|
| 3,919,736 A | | 11/1975 | Bourassa et al. |
| 3,942,212 A | * | 3/1976 | Steger et al. .............. 15/250.201 |
| 7,210,190 B2 | * | 5/2007 | Schmid et al. ............. 15/250.43 |
| 7,690,073 B2 | * | 4/2010 | Marmoy et al. ........... 15/250.32 |
| 2006/0037167 A1 | * | 2/2006 | Nacamuli ................ 15/250.201 |

FOREIGN PATENT DOCUMENTS

| | | |
|---|---|---|
| DE | 202 20 355 U1 | 4/2004 |
| DE | 103 33 083 A1 | 2/2005 |
| FR | 2 267 910 A1 | 11/1975 |
| FR | 2 276 964 A1 | 1/1976 |
| WO | 2005/108178 A1 | 11/2005 |
| WO | 2005/118363 A | 12/2005 |

OTHER PUBLICATIONS

Braun et.al, Wiper Blade, Feb. 14, 2008, WO 2008/017532 A1.*
International Search Report w/translation from PCT/EP2007/055693 dated Jul. 8, 2007 (6 pages).

* cited by examiner

*Primary Examiner* — Joseph J Hail
*Assistant Examiner* — Henry Hong
(74) *Attorney, Agent, or Firm* — Osha Liang LLP

(57) ABSTRACT

A method of manufacturing a windscreen-wiper blade for a motor vehicle is disclosed. The blade includes at least one mounting element in which a housing and an attachment rail are arranged parallel to the longitudinal axis of the mounting element, an elastically deformable spine arranged inside the housing of the mounting element, and a wiping strip, including a heel interlocked inside said rail of the mounting element. The method involves hot deformation of at least one longitudinal end of the mounting element, so as to immobilize the spine and the wiping strip longitudinally inside the housing and the rail of the mounting element, respectively.

8 Claims, 4 Drawing Sheets

METHOD FOR MANUFACTURING A WINDSHIELD WIPER BLADE

The present invention relates to a method of manufacturing a windscreen-wiper blade.

It is generally, but not exclusively, applied to the field of flat windscreen-wiper blades for motor vehicles.

Document WO-2005/118363 describes a flat windscreen-wiper blade, as shown in FIG. 1.

Said blade 1 comprises a linking element 2 designed to connect the flat blade to a windscreen wiper arm, and two mounting elements 3, 4 located on either side of the linking element 2, in each of which are arranged a housing 6 and an attachment rail 7 parallel to the longitudinal axis A-A of said mounting element 3, 4.

Said housing 6 and rail 7 respectively communicate with a housing and a rail of said linking element 2.

Said blade 1 also comprises an elastically deformable spine, usually metallic, arranged inside the respective housings of the linking element and each mounting element 3, 4, said housings being substantially aligned in a continuous fashion, and a rubber wiping strip 9, comprising a heel interlocked inside the respective rails of the linking element 2 and each mounting element 3, 4, said rails being substantially aligned in a continuous fashion.

Locking means can immobilise the spine and the wiping strip inside the mounting elements together with the linking element.

In one embodiment, the locking means consist of crushing the outer longitudinal end of the rail of each mounting element.

In another embodiment, the locking means are equipped with an elastically deformable tongue. Said tongue is solidly attached to the linking element, and a protruding part of said tongue which extends inside the housing is capable of cooperating by interlocking with a notch arranged along the spine.

In another embodiment, the locking means are equipped with a part of the mounting element which is capable of deforming locally and of cooperating by interlocking with a hole arranged in the spine.

Document WO-2005/108178 describes a longitudinal end tip of a flat windscreen-wiper blade, designed to be mounted on the front longitudinal end of a blade support structure.

The blade support structure comprises a single longitudinal mounting element and an elastically deformable spine mounted inside the mounting element.

In order to attach the wiping strip to the mounting element, the longitudinal end tip comprises means for attachment to the mounting element and/or the spine, as well as means for attachment to the wiping strip.

Said longitudinal end tip of the windscreen-wiper blade comprises an open hollow body accommodating one longitudinal end of the spine, and means for locking the longitudinal end of the spine in engaged position in the hollow body.

A tongue, made in the side wall of the hollow body, comprises a lug which is accommodated in a notch in the spine for longitudinally locking the spine in engaged position in the cylindrical housing.

However, the means for locking or retaining the spine and the wiping blade inside the mounting element, whether they involve an assembly of supplementary closing parts such as a longitudinal end tip, mechanical deformation, clipping or interlocking, as described in the state of the art, are fragile and not suitable for retaining the spine and the wiping strip in the mounting element in a durable manner.

The invention aims to solve the problems of the prior art by providing an easily implemented, inexpensive method of retaining the spine and the wiping strip inside the mounting element(s) present, together with the linking element, and having optimised reliability and strength.

For this purpose, the invention relates to a method of manufacturing a windscreen-wiper blade for a motor vehicle, the blade comprising at least one mounting element in which a housing and an attachment rail are arranged parallel to the longitudinal axis of said mounting element, an elastically deformable spine arranged inside said housing of the mounting element, and a wiping strip, comprising a heel interlocked inside said rail of the mounting element, the method comprising a step of hot deformation of at least one longitudinal end of the mounting element, so as to immobilise said spine and said wiping strip longitudinally inside said housing and said rail of the mounting element respectively.

Thanks to the invention, the method can reliably guarantee the stopping of the spine and the wiping strip at the longitudinal ends of a windscreen-wiper blade, without adding any extra parts to said longitudinal ends.

Furthermore, said longitudinal ends prevent water from seeping into the metallic spine housing while providing durable support of the spine and the wiping strip arranged inside the mounting elements together with the linking element.

In one specific example, the hot deformation consists of deformation by melting said longitudinal end, preferably by ultrasonic sealing, contact fusion or hot air blowing.

In another specific example, the hot deformation consists of deformation by adding material to said longitudinal end, preferably by thermoplastic welding.

According to a particularly interesting embodiment, the method also comprises a stage, prior to the hot deformation stage, of cutting said longitudinal end of the mounting element, so as to obtain a non-protruding longitudinal end, after melting said longitudinal end.

This cutting step provides non-aggressive longitudinal ends of the flat windscreen-wiper blade to meet safety regulation requirements.

Furthermore, when the cutting step is carried out previously, it is not necessary to resort to numerous tools for altering the protruding longitudinal ends and the method according to the invention proves to be particularly inexpensive.

In one specific example, the longitudinal end is cut in a plane forming an acute angle with the bottom horizontal surface of the mounting element, said acute angle preferably being substantially equal to 700.

The "horizontal" and "bottom" qualifiers are defined later in the present invention.

According to another embodiment, the method also comprises a step, in addition to the hot-deformation step, of shaping the hot-deformed longitudinal end.

The shaping of said longitudinal ends using a tool with an adapted shape makes it possible to obtain non-aggressive longitudinal ends while retaining a pleasing overall aestheticism.

The present invention also relates to a windscreen-wiper blade for a motor vehicle which can be obtained by the method according to the invention, the windscreen-wiper blade comprising at least one hot-deformed longitudinal end.

Further characteristics and advantages of the present invention will become apparent in light of the following examples made in reference to the appended drawings, said examples and drawings being provided merely as an illustration in a strictly non-limiting manner.

For reasons of clarity, only the elements which are essential for understanding the invention are shown, without being drawn to scale.

FIGS. 2A, 2B and 3 depict one embodiment of a flat windscreen-wiper blade 1, designed to equip a windscreen-wiping device of a motor vehicle, according to the method of the present invention.

Figure 1:
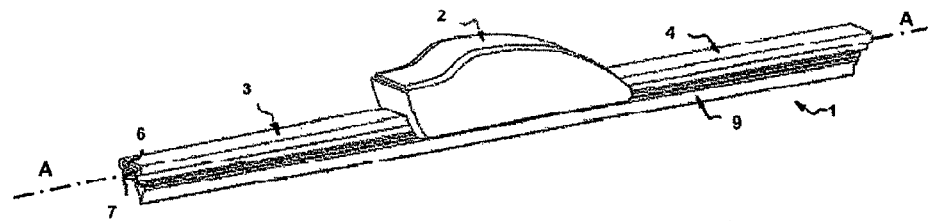
FIG. 1 shows a side perspective view of a flat windscreen wiper blade according to the prior art.
Figure 2A:
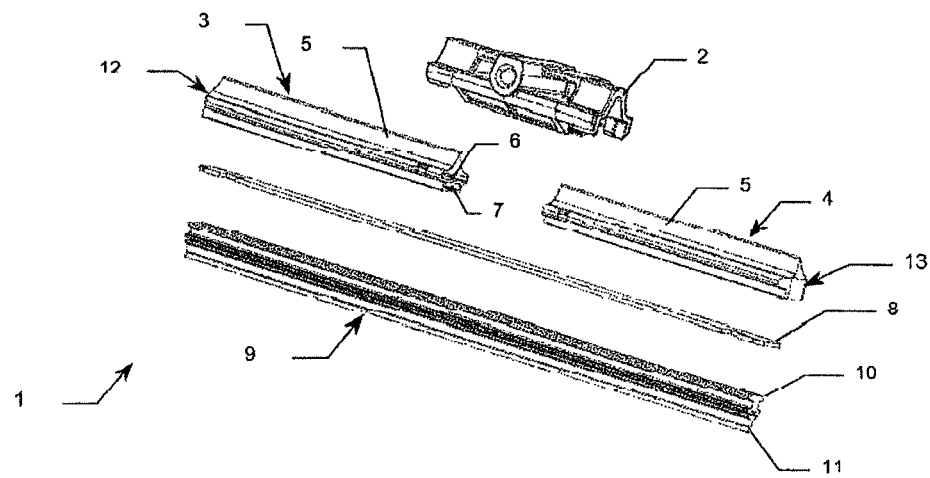
FIG. 2A is an exploded side perspective view of a flat windscreen-wiper blade according to the method of the invention comprising two mounting elements.
Figure 2B:
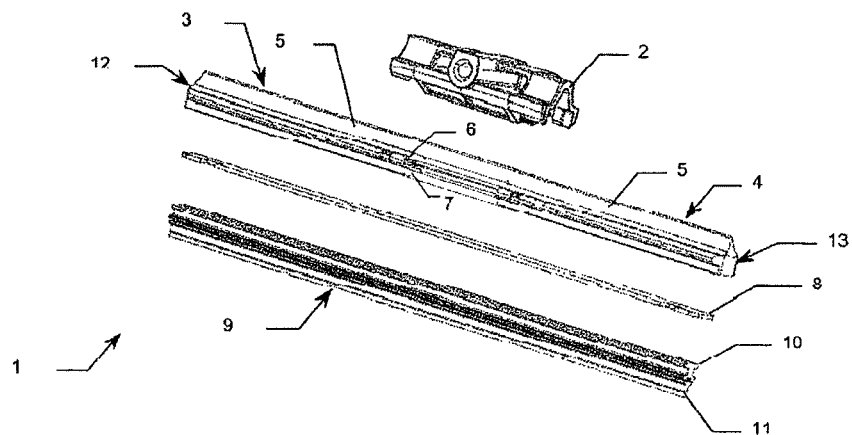
FIG. 2B is an exploded side perspective view of a flat windscreen-wiper blade according to the method of the invention comprising a single mounting element.

According to FIGS. 2A and 2B, the flat blade 1 is equipped with a linking element 2, designed to connect the flat blade 1 to the motor vehicle windscreen-wiping device (not shown).

As shown in FIG. 2A, the flat blade 1 comprises two plastic mounting elements 3, 4 which are located on either side of the linking element 2.

The "top", "bottom" and "horizontal" qualifiers are defined in the present invention in relation to the positioning of a windscreen-wiper blade as shown in FIGS. 1 to 8.

According to a common embodiment of a flat windscreen-wiper blade, the mounting elements 3, 4 are aerodynamically shaped in such a way that the relative wind generated during the movement of the vehicle presses the blade against the glass to be wiped, and they comprise a concave top wall 5.

Each mounting element 3, 4 is equipped with a housing 6 and a rail 7, which are open at both their longitudinal ends.

Said housing 6 and rail 7 are both arranged parallel to the longitudinal axis A-A of each mounting element 3, 4.

The linking element 2 is also equipped with a housing and a rail.

The flat blade 1 comprises an elastically deformable spine 8, preferably metallic, arranged inside the housing of the linking element 2 and the housing 6 of each mounting element 3, 4.

The flat blade 1 is also equipped with a wiping strip 9 comprising a heel 10 and equipped with a lip 11 designed to cooperate directly by sliding contact with any surface to be wiped.

The heel 10 of the wiping strip 9 is interlocked inside the rail of the linking element 2 and the rail 7 of each mounting element 3, 4.

Figure 3:
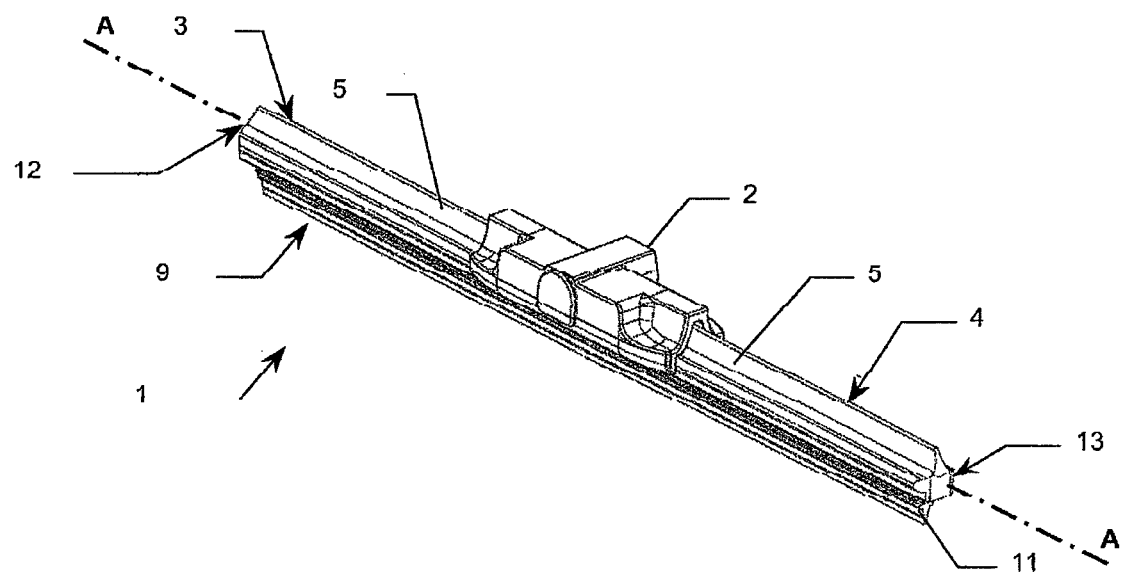
FIG. 3 shows FIG. 2A or 2B in a non-exploded side perspective view.

As shown in FIG. 3, the whole is arranged in such a way that, when the flat blade 1 is assembled, the housing 6 and the rail 7 of each mounting element 3, 4, communicate respectively with the housing and the rail of the linking element 2.

Said housings, on the one hand, of the linking element 2 and, on the other hand, of the mounting elements 3, 4 are aligned in a known way, the same as said rails, on the one hand, of the linking element 2 and, on the other hand, of the mounting elements 3, 4.

In the variation shown in FIG. 2B, the flat blade 1 comprises a single plastic mounting element made up of two parts 3, 4 located on either side of the linking element 2 once it is installed on the flat blade 1. In this case, the linking element 2 is positioned by correspondence of shapes on the mounting element and fits tightly around it, thanks to known means, so as to obtain the necessary hold.

After assembling the windscreen-wiper blade 1 following the method according to the invention, the two longitudinal ends 12, 13 of said blade 1 are hot deformed, particularly the longitudinal end 12 of the mounting element 3, and the longitudinal end 13 of the mounting element 4, opposite the linking element 2.

Said hot deformation melts the plastic material of the longitudinal end 12, 13 of the mounting element 3, 4, and in particular, melts the plastic material of the walls of the housing 6 and the rail 7 of said longitudinal end 12, 13.

After cooling the melted material, said longitudinal end 12, 13 of the housing 6 and the rail 7 is obstructed by said melted material.

The spine 8 and the heel 10 of the wiping strip 9 are then immobilised longitudinally in the windscreen-wiper blade 1, particularly in the mounting elements 3, 4, together with the linking element 2.

This embodiment is described below in more detail.

Figure 4:
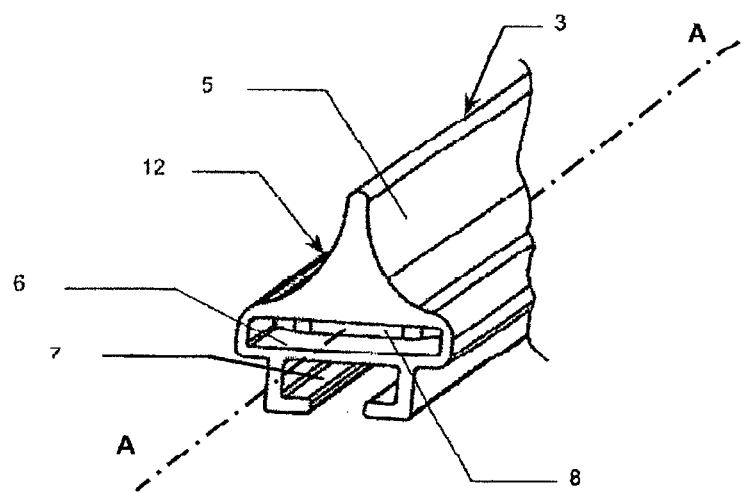
FIG. 4 shows a perspective view of one longitudinal end of a flat windscreen-wiper blade, without a wiping strip, before carrying out the method according to the invention.

FIG. 4 shows a perspective view of a longitudinal end 12 of a flat windscreen-wiper blade 1, before carrying out the method according to the invention.

The longitudinal end 12 of the blade 1 comprises a plastic mounting element 3 topped by a concave wall 5, an elastically deformable metallic spine 8 and a wiping strip (not shown).

The metallic spine 8 is arranged inside the housing 6 of the mounting element 3.

The wiping strip (not shown) is interlocked inside the rail 7 of the mounting element 3.

Figure 5:
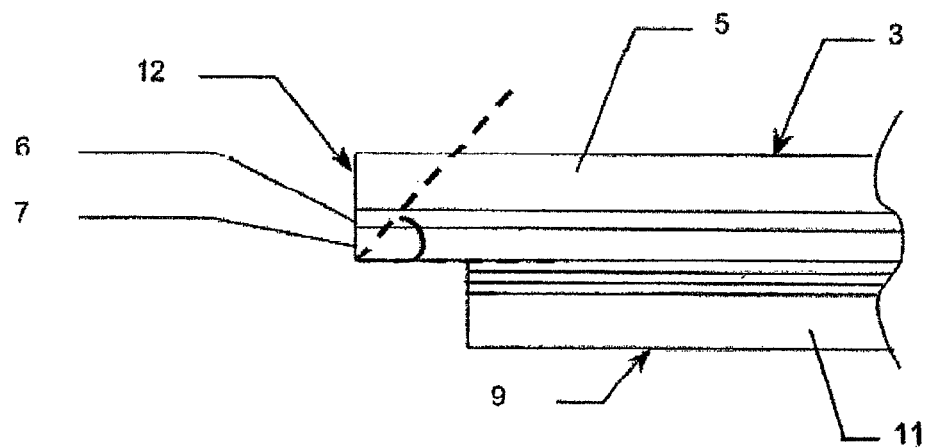
FIG. 5 shows a simplified schematic front view of the flat windscreen-wiper blade of FIG. 4 with a wiping strip.

According to the invention and according to FIG. 5, the longitudinal end 12 undergoes a cutting step.

The longitudinal end 12 is thus cut in a cutting plane forming an acute angle with the bottom horizontal surface of the mounting element 3.

In particular, the surface of the longitudinal end 12 which is perpendicular to the longitudinal axis A-A of the mounting element 3 is cut in a cutting plane forming an acute angle with the horizontal bottom surface of the mounting element 3.

The acute angle is preferably substantially equal to 70°.

Figure 6:
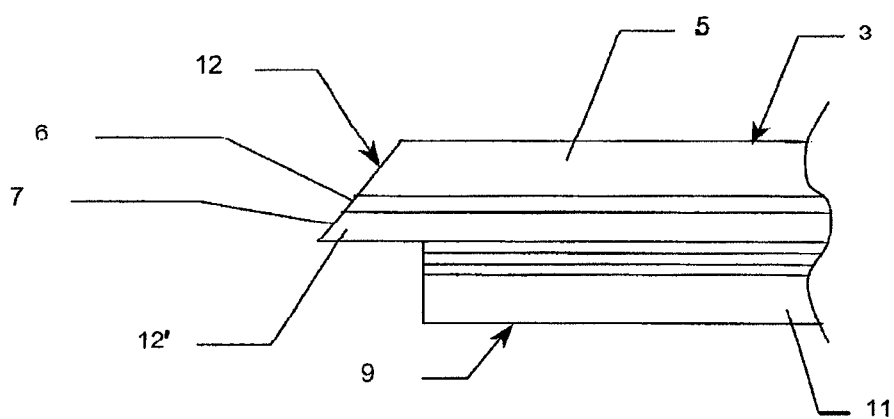
FIG. 6 shows a schematic front view of the flat blade of FIG. 5, after the cutting step, according to the method of the invention.

The longitudinal end 12 of the mounting element 3, thus obtained after cutting, has a surplus of material 12' which can also be defined as leftover material 12', as shown in FIG. 6.

The surplus material 12' is melted by ultrasonic sealing, contact fusion or hot air blowing by placing the hot-deformation tool facing said surplus material 12', in a plane perpendicular to the longitudinal axis A-A of the mounting element 3.

The surplus material 12, mainly made up of the housing 6 and rail 7 walls, obstructs the housing 6 and the rail 7 of the mounting element 3 by melting.

After cooling, the melted surplus material 12' longitudinally immobilises the spine 8 and the wiping strip respectively inside said housing 6 and said rail 7 at said longitudinal end 12.

Figure 7:
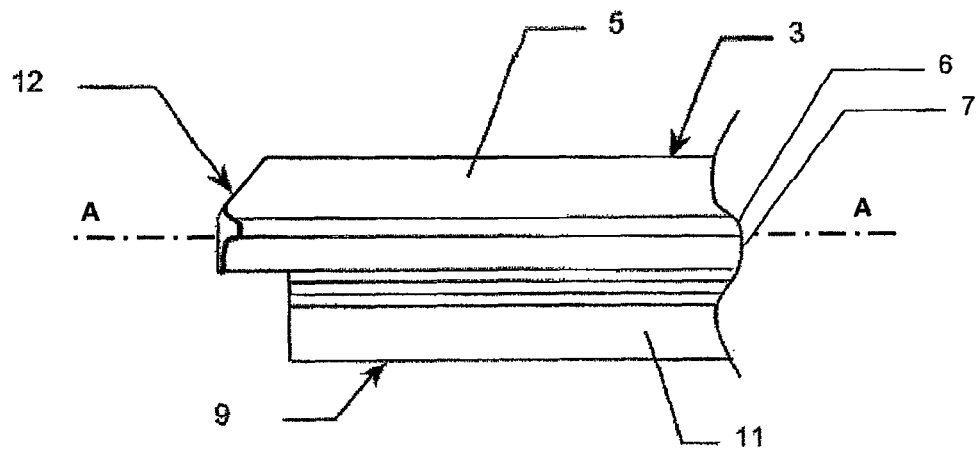
FIG. 7 shows a schematic front view of the flat blade of FIG. 6, after the hot-deformation and shaping step, according to the method of the invention.
Figure 8:
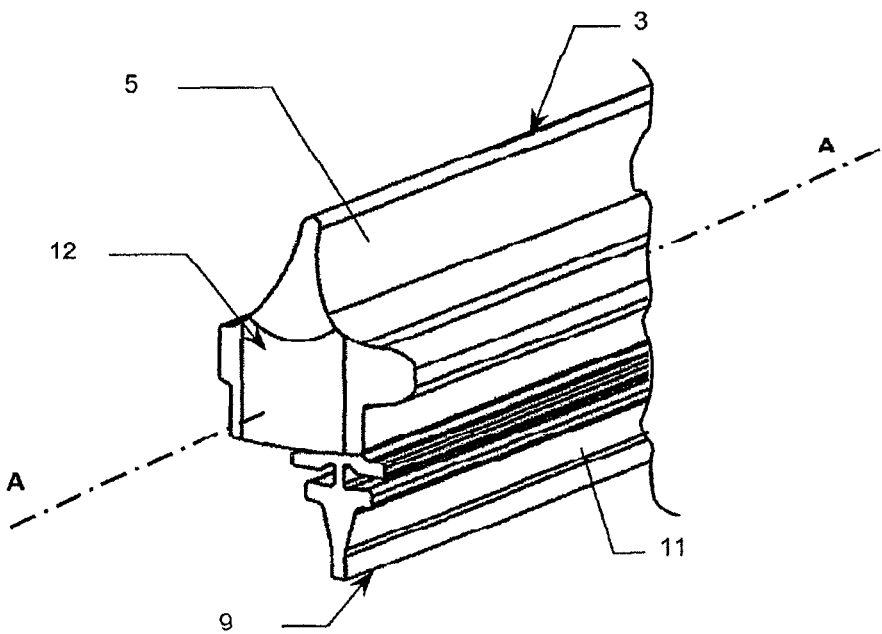
FIG. 8 shows a perspective view of one longitudinal end of the flat windscreen-wiper blade of FIG. 7, according to the method of the invention.

FIGS. 7 and 8 show the longitudinal end 12 of the mounting element 3 once shaping is carried out according to the invention, after the hot-deformation step.

The longitudinal end 12 is shaped using a suitable tool such as a shape mould applied facing said longitudinal end 12, in a plane perpendicular to the longitudinal axis A-A of the mounting element 3.

The longitudinal end 12 of the mounting element 3, thus obtained, has a symmetrical, rounded, non-aggressive shape and, in particular, the concave top wall 5 of said longitudinal end 12 does not protrude.

The method according to the invention thus meets safety regulation requirements.

Furthermore, the longitudinal end 12 obtained by the method according to the invention retains an overall pleasing aestheticism.

The present invention is not limited to the example of an embodiment of the method described above and relates to all possible methods based on the general instructions provided in this account of the invention.

In particular, the hot deformation of the longitudinal ends of a windscreen-wiper can be deformation by adding material to said longitudinal ends, preferably by thermoplastic welding.

The invention claimed is:

1. A method of manufacturing a windscreen-wiper blade for a motor vehicle, the blade comprising:
   at least one mounting element in a longitudinal direction in which a housing and an attachment rail are arranged parallel to the longitudinal axis of said mounting element,
   an elastically deformable spine arranged inside said housing of the mounting element, and
   a wiping strip, comprising a heel interlocked inside said rail of the mounting element,
   wherein the method comprises:
      hot deformation of at least one longitudinal end of the mounting element by melting plastic material of walls of the housing and the rail of said longitudinal end, so as to longitudinally immobilise said spine and said wiping strip, respectively inside said housing and said rail of the mounting element.

2. The method according to claim 1, wherein the hot deformation consists of deformation by melting said longitudinal end, by ultrasonic sealing, contact fusion or hot air blowing.

3. The method according to claim 1, wherein the hot deformation consists of deformation by adding material to said longitudinal end, by thermoplastic welding.

4. The method according to claim 1, wherein, prior to the hot-deformation, the method comprises:
   cutting said longitudinal end of the mounting element, so as not to obtain a protruding longitudinal end after melting said longitudinal end.

5. The method according to claim 4, wherein the longitudinal end is cut according to a cutting plane forming an acute angle with the bottom horizontal surface of the mounting element.

6. The method according to claim 5, wherein said acute angle is substantially equal to 70°.

7. The method according to claim 1, wherein, in addition to the hot-deformation, the method further comprises:
   shaping the hot-deformed longitudinal end.

8. A windscreen-wiper blade for a motor vehicle, obtained using the method according to claim 1, wherein the windscreen-wiper blade comprises at least one hot-deformed longitudinal end.

* * * * *